US007425898B2

(12) United States Patent
Ryckman

(10) Patent No.: US 7,425,898 B2
(45) Date of Patent: Sep. 16, 2008

(54) LABEL WITH REMOVABLE RFID PORTION

(75) Inventor: Robert W. Ryckman, Furlong, PA (US)

(73) Assignee: CCL Label, Inc., Highstown, NJ (US)

(*) Notice: Subject to any disclaimer, the term of this patent is extended or adjusted under 35 U.S.C. 154(b) by 161 days.

(21) Appl. No.: 11/421,530

(22) Filed: Jun. 1, 2006

(65) Prior Publication Data

US 2007/0279233 A1 Dec. 6, 2007

(51) Int. Cl.
*G08B 13/14* (2006.01)
(52) U.S. Cl. ............... 340/572.1; 340/572.3; 235/385; 235/376; 235/492
(58) Field of Classification Search ............ 340/572.1, 340/572.3, 572.4, 572.8; 235/375, 376, 385, 235/492
See application file for complete search history.

(56) References Cited

U.S. PATENT DOCUMENTS

| 5,389,415 | A | * | 2/1995 | Kaufmann ............... 428/41.3 |
| 5,570,081 | A | | 10/1996 | Holstrom |
| 5,767,772 | A | | 6/1998 | Lemaire |
| 5,936,525 | A | | 8/1999 | Leyden |
| 5,958,536 | A | * | 9/1999 | Gelsinger et al. ........ 428/40.1 |
| 6,217,966 | B1 | * | 4/2001 | Finster et al. ............ 428/42.1 |
| 6,281,795 | B1 | * | 8/2001 | Smith et al. ............. 340/572.1 |
| 6,432,500 | B1 | | 8/2002 | Jones |
| 6,610,379 | B1 | | 8/2003 | Adams |
| 6,637,775 | B1 | * | 10/2003 | Bernier et al. ............. 283/94 |
| 6,660,353 | B2 | | 12/2003 | Siedl |
| 6,777,054 | B1 | | 8/2004 | Roth |
| 6,836,215 | B1 | | 12/2004 | Laurash |
| 6,888,509 | B2 | | 5/2005 | Atherton |
| 6,919,806 | B2 | | 7/2005 | Narlow |
| 6,919,807 | B2 | | 7/2005 | Shek |
| 7,195,689 | B2 | * | 3/2007 | Adams et al. ............. 156/252 |
| 7,212,127 | B2 | * | 5/2007 | Jacober et al. ........... 340/572.8 |
| 2004/0195824 | A1 | | 10/2004 | Blank |
| 2005/0091896 | A1 | | 5/2005 | Kotik |

* cited by examiner

*Primary Examiner*—Jeff Hofsass
*Assistant Examiner*—Edny Labbees
(74) *Attorney, Agent, or Firm*—Warner Norcross & Judd LLP

(57) ABSTRACT

A self adhesive label including a removable RFID tag. The multi-layer label includes a content label and a base label. A removable portion of the content label includes an RFID tag. An exposable portion of the base label is exposed when the removable portion of the content label is removed. The exposable portion of the base label includes markings substantially similar to markings on the removable portion. A related method includes the steps of permanently applying a label to an article in which the label includes a removable RFID tag; utilizing the RFID tag while applied to the article; and subsequently removing the RFID tag without substantially damaging the label before further transfer of the article.

13 Claims, 3 Drawing Sheets

LABEL WITH REMOVABLE RFID PORTION

BACKGROUND OF THE INVENTION

The present invention relates to RFID labels, and more particularly to RFID labels in which the RFID device can be easily removed.

Radio Frequency Identification (RFID) tags have been used for years to track everything from cows and railroad cars to airline baggage and highway tolls. As RFID tags affordability increases some companies are choosing to attach them to their products. Some applications of RFID tags include medication tracking, anti-theft efforts, enhanced inventory tracking, and anti-counterfeiting efforts. For example, in some supermarkets consumer items may have RFID tags attached which can automatically communicate with an RFID reader to help reduce the lengthy check-out process. Unfortunately, some customers are concerned about their privacy because any RFID reader within range, not just the supermarket RFID reader, can access the RFID tags.

Some consumers believe their privacy will be invaded by unauthorized access to confidential information stored in an item's RFID tag. In some cases, an item's RFID tag is uniquely linked with the purchaser's credit card upon completion of a transaction. Some consumers feel the creation of a link between the item and buyer invades the buyer's privacy.

Confidentiality is an especially big concern to pharmaceutical customers. Some pharmaceutical labels are removable so a customer can remove confidential information on the label before discarding the pharmaceutical item into the garbage where it could be viewed by anyone. Unfortunately, this solution fails with RFID tags because they can be read from a distance without knowledge or consent by anyone with an RFID reader. While a pharmaceutical customer has some control over access to confidential information on a label by virtue of having control over the physical pharmaceutical item itself, the same is not true of an RFID labeled pharmaceutical item. Hence, once a customer purchases an item with an RFID tag, limiting unauthorized access to the RFID tag becomes problematic. Some customers may attempt to remove the RFID tag at the time of purchase, however this solution is unsatisfactory because removing the RFID tag may damage the label or underlying goods.

SUMMARY OF THE INVENTION

The aforementioned problems are overcome by the present invention wherein a label including an RFID device is adapted for permanent placement on an article, and further wherein the RFID device is readily removable from the label. The label is applied to an article for use throughout the manufacturing process, supply chain, distribution, and retail outlets; and the RFID device is removable prior to or at the time of transfer or sale of the item by the end user or check-out process.

One embodiment of the invention is directed to the label itself—namely a multi-ply self adhesive label including a content label and a base label. The content label may include a removable portion with an RFID tag and a permanent portion. The base label may include an unexposable portion and an exposable portion. Permanent adhesive secures the permanent portion of the content label to the unexposable portion of the base label. Releasable adhesive removably adheres the removable portion of the content label to the exposable portion of the base label.

In another embodiment directed to a multi-ply self adhesive label, the content label, including an RFID tag, is completely removable to fully expose the base label.

The removable portion of the content label may include markings and the exposable portion of the base label may include substantially similar or identical markings. The markings on the removable portion of the content label may include confidential information, which the exposable portion of the content label does not include.

In yet another embodiment, the exposable portion of the base label may be transparent and expose the article to which the label is attached.

Another embodiment of the invention is directed to a roll of such labels mounted on a release liner.

Yet another embodiment of the invention is directed to a method of using the label. The first step is applying the label with the RFID tag to an article. The second step is utilizing the RFID tag while it is on the article. The last step is subsequently removing the RFID tag without substantially damaging the label before further transfer of the article.

These and other objects, advantages, and features of the invention will be readily understood and appreciated by reference to the detailed description of the current embodiment and the drawings.

DESCRIPTION OF THE CURRENT EMBODIMENT

The elements illustrated in the Figures interoperate as explained in more detail below. Before setting forth the detailed explanation, however, it is noted that all of the discussion below, regardless of the particular implementation being described, is exemplary in nature, rather than limiting.

An apparatus and method that allows an RFID or other wireless device to be removably adhered to a labeled article is provided. An RFID device is used for discussion of the following embodiments, however any wireless device may be implemented. An RFID device may be utilized in various ways while attached to an article. For example, the RFID device may be used for medication tracking, anti-theft efforts, electronic pedigree, enhanced inventory tracking, anti-counterfeiting, or any combination thereof. An RFID device's applications are near limitless because it may be programmed to store any kind of data. For example, an RFID device may store data about the labeled article or the recipient of the labeled article.

Figure 1:
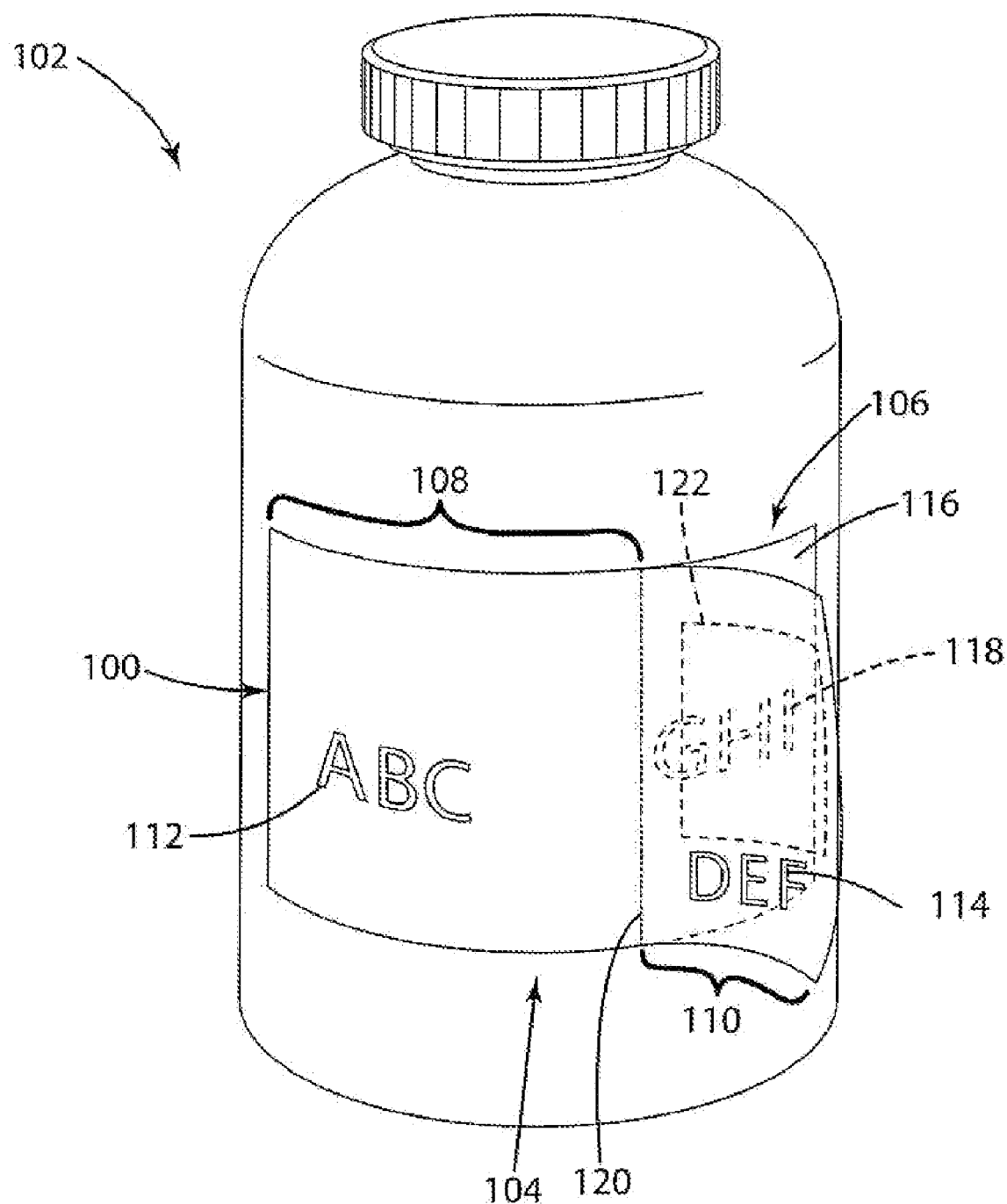
FIG. 1 is a perspective view of an RFID removable label attached to a pharmaceutical item.

FIG. 1 is a perspective view of an RFID removable label 100 adhered to an article 102. The RFID removable label 100 may be applied during the manufacturing process to allow tracking throughout the manufacturing process, supply chain, distribution chain, and retail outlets. The RFID removable label 100 contains an RFID device 122 that will be described in more detail below. The RFID device may be subsequently removed at the time of sale of or transfer of the article by the recipient or check out process to alleviate privacy concerns.

The article 102 may be any article capable of accepting an RFID removable label 100. For example, the article 102 may be a pharmaceutical container used for storing various drugs administered at a retail drugstore. The article 102 could be almost anything, another example of an article 102 may be a consumer grocery item such as a gallon of milk. Preferably, the article 102 allows a recipient to take advantage of the privacy relief features of the RFID removable label. The portion of the article 102 capable of accepting the RFID removable label may be a substrate or essentially any other material.

The RFID removable label 100 may be a multi-ply label including a content label 104 with a top side and bottom side and a base label 106 with a top side and bottom side. The content label may include a permanent portion 108, a removable RFID portion 110, and a line of weakening 120 between the permanent portion and the removable portion. The removable RFID portion 110 includes an RFID device 122. In one embodiment, the RFID device 122 may be protected by a laminate 210, or other protective mechanism, to protect the integrity of the RFID device. The base label 106 may include an unexposable portion (not depicted in FIG. 1) as well as an exposable portion 116.

The RFID device may be removed by separating the permanent portion of the content label 108 from the removable portion of the content label 110 along the line of weakening 120. This removal may be facilitated, instead of or in addition to the line of weakening 120, by perforation or any other removal mechanism which will not substantially damage the label or article upon separation. In one embodiment, the removable portion of the content label 110 is further separated from the exposable portion of the base label 116 to remove the RFID device 122.

The permanent portion 108 and the removable RFID portion 110 of the content label may include markings graphics 112 and 114 respectively. The exposable portion of the base label 116 may also include graphics or markings 118. These markings will be discussed in more detail below.

In an alternative embodiment, a roll of RFID removable labels 100 may be mounted on a release liner 208 at spaced locations along the longitudinal direction of the release liner 208. The RFID removable labels 100 may be releasably adhered to the release liner 208 to facilitate application of the label to an article 102. In one embodiment, pressure sensitive adhesive performs the adhesion.

Figure 2:
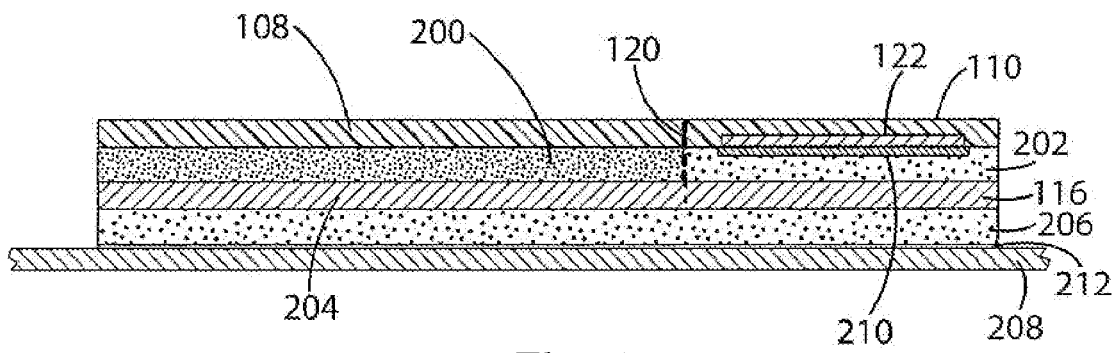
FIG. 2 is an exploded side view of the RFID removable label.

FIG. 2 is an exploded side view of a multi-ply RFID removable label 100 mounted on a release liner 208. This view includes the content label 104, adhesive 200 and 202 between the content label 104 and the base label 106, adhesive 206 between the base label and the release liner 208.

In one embodiment, an RFID device 122 is secured to the removable RFID portion of the content label 110 with permanent adhesive or any other type of adhesive. The RFID device is preferably sandwiched between the removable RFID portion of the content label 110 and the exposable portion of the base label 116.

The adhesive 200 between the permanent portion of the content label and the unexposable portion of the base label 204 may be permanent adhesive 200 or any other type of adhesive. The permanent adhesive 200 assures that if the removable RFID portion of the content label 110 is removed the permanent portion of the content label 108 remains intact and undamaged.

The adhesive 202 between the removable portion of the content label and the exposable portion of the base label 116 may be pressure sensitive adhesive 202, any other type of temporary adhesive, or may not exist at all. The pressure sensitive adhesive 202 assures that the removable portion of the content label 110 is removable from the exposable portion of the base label without causing damage to the underlying article 102 or the remaining label 100.

The adhesive 206 between the base label 106 and the release liner 208 may be pressure sensitive adhesive 206 or any other adhesive. The pressure sensitive adhesive 206 facilitates the removal of the entire RFID removable label 100 from the release liner 208 and permanent application of the entire RFID removable label 100 to an article 102.

The release liner 208 may be a paper or film material that acts as a carrier for the RFID removable label 100. The release liner 208 stays with the RFID removable label 100 until it is ready to be applied to an article 102. The thickness of the liner may vary according to the intended use of the label. The release liner 208 may have a silicone release coating 212. The coating allows the release liner 208 to separate from the base label 106 more easily. The type of release coating 212 may vary according to the desired difficulty of releasing the base label 106 from the release liner 208.

Figure 3:
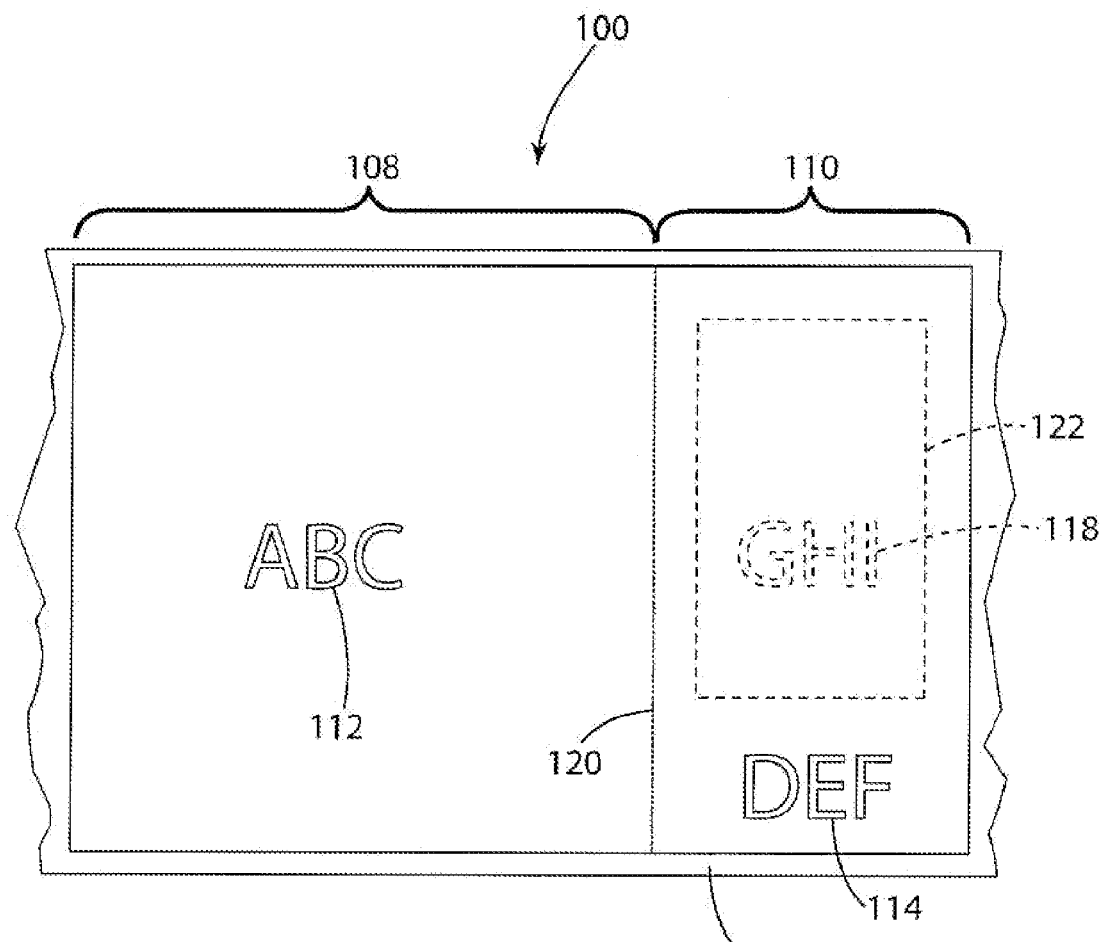
FIG. 3 is a top view of the RFID removable label.

FIG. 3 illustrates a top view of the RFID removable label 100. Specifically, the permanent portion of the content label 108, the removable portion of the content label 110, and the line of weakening 120 between them are shown. As discussed above, markings 112 may appear on the top side of the permanent portion of the content label 108 and may include confidential or non-confidential information about the labeled article or about the user of the labeled article. Markings 114 may also appear on the top side of the removable portion of the content label 110 and may also include confidential or non-confidential information about the labeled article or about the user of the labeled article. Further, markings 118 on the top side of the exposable portion of the base label 116 (shown in FIG. 1) may also include confidential or non-confidential information about the labeled article or about the user of the labeled article. For example, markings 112, 114, and/or 118 may include a name, address, article contents description, instructions, or any combination thereof.

In one embodiment, at least some of the markings 112, 114, and 118 are associated with the article 102 and/or the labeled article's recipient. In another embodiment, makings 114 are identical or substantially similar to markings 118. In yet another embodiment, markings 118 only contain non-confidential information or don't exist so that when the removable RFID portion 110 of the content label is removed the remaining portions of the label are free from RFID devices and confidential information. Further, in this embodiment, markings 118 on the exposable portion of the base label 116 may be a non-confidential version of the confidential markings 112 on the removable portion of the content label 110.

In yet another embodiment, the base label 106 may be transparent. The base label 106 may be any level of transparency including but not limited to partially transparent, substantially transparent, or completely transparent. The transparency may reveal the surface of the article to which the label 100 is attached when the removable portion 110 of the content label is removed.

Figure 4:
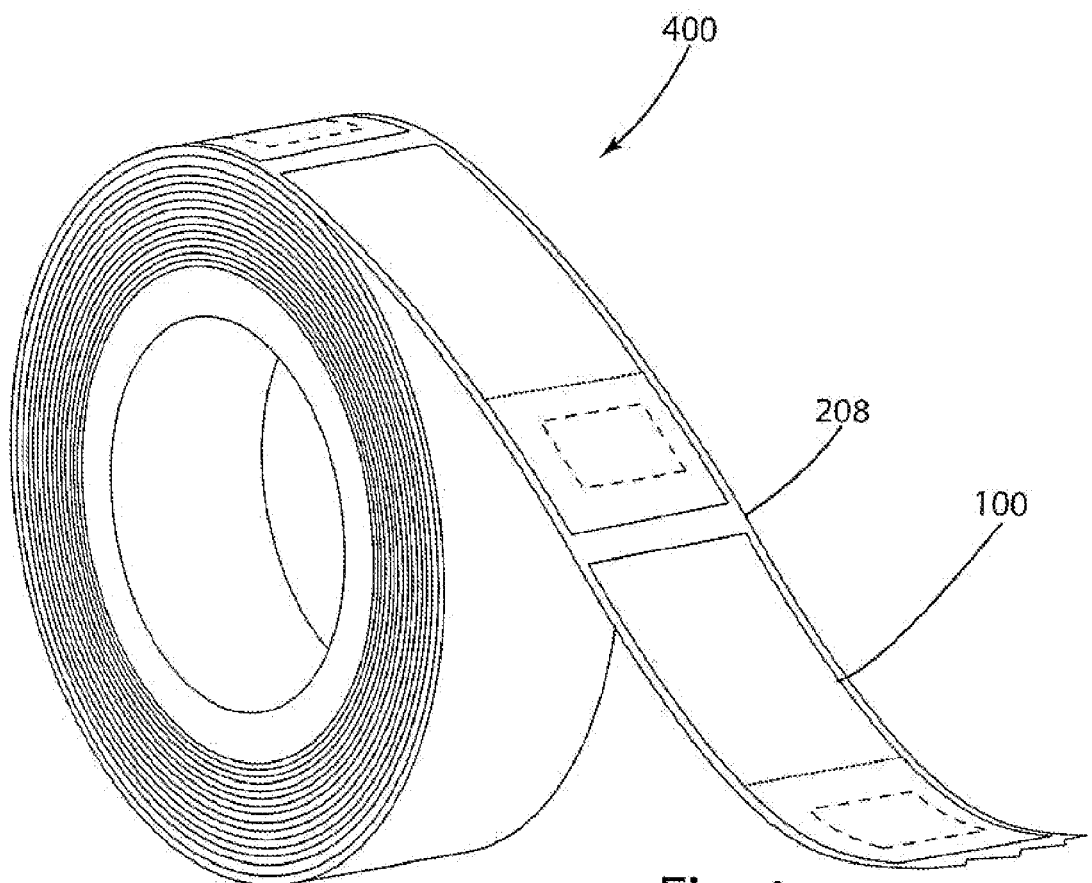
FIG. 4 is a perspective view of a roll of RFID removable labels.

Referring to FIG. 4, a perspective view of a label roll is depicted. The label roll 400 includes a release liner 208, a plurality of RFID removable labels 100 each including a base label and a content label. The base labels may be mounted on the release liner at any location on the release liner 208 using any of the techniques described above. The content labels each have a removable portion releasably secured to one of the base labels and a permanent portion permanently secured to the one base label. Further, the removable portion of each content label includes a wireless device.

A method of labeling an article is provided. The labeling may be performed by a human or a machine. The method includes the steps of applying a label permanently to an article, the label may include a readily removable RFID device; utilizing the RFID device while it is applied to the article; and subsequently removing the RFID device without substantially damaging the label before the further transfer of the article. Use of this method may result in increased privacy for some recipients.

Figure 5:
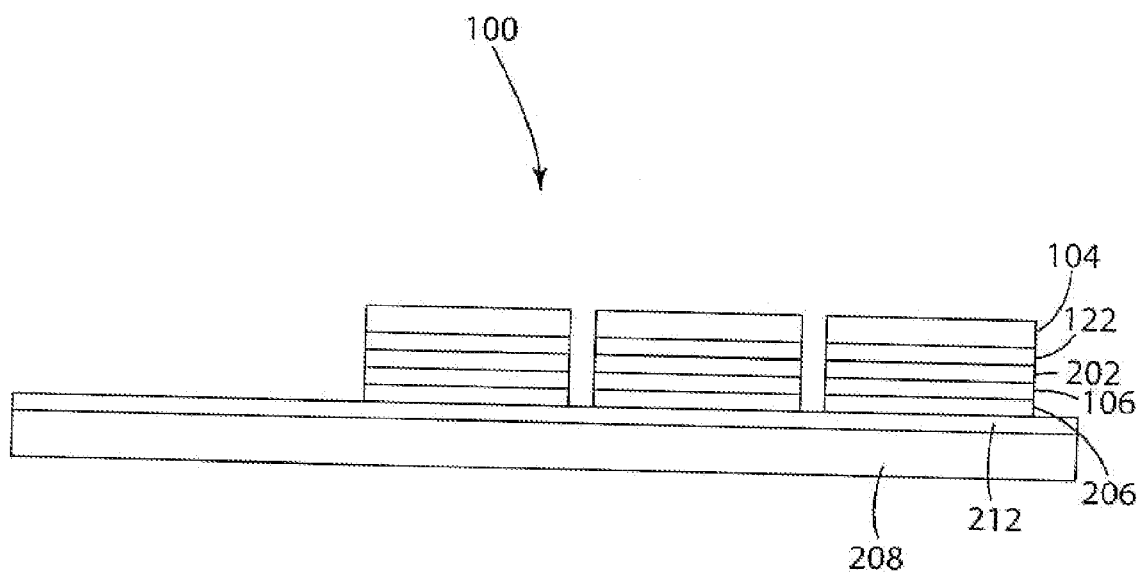
FIG. 5 is a side view of an alternative embodiment of the RFID removable label with thickness exaggerated for explanation.

FIG. 5 is a side view of an alternative embodiment of a multi-ply RFID removable label 100 mounted on a release liner 208. The label includes the content label 104, the RFID device 122, a base label 106, a release liner 208, a release coating 212, and adhesive 202 and 206.

In one embodiment, the RFID device 122 is secured to the content label 104 with permanent adhesive or any other suitable adhesive. In contrast to the earlier described embodiments, the content label 104 does not include a physical indication of division into multiple portions. Instead, the content label 104 and RFID device 122 may be entirely removed from the base label 106. Alternatively, the content label 104 and RFID device 122 may be partially removed from the base label 106 by tearing the content label. Removal may occur via peeling, tearing, or essentially any other removal technique which does not substantially damage the base label 106. In one embodiment, the base label 106 is transparent; and, when the content label 104 and RFID device 122 are completely removed the article surface is exposed. In this embodiment it is difficult to tell the article was labeled with an RFID removable label 100.

The present invention results in distinct advantages. An article may be tracked with an RFID tag during manufacture, distribution, and retail anytime before the point of sale. The removable RFID portion of the label may be removed without damaging the rest of the label which is permanently adhered to the article. Further, the RFID portion may be removed without damaging the article itself either. This results in an increase in privacy for the recipient of the article with the RFID device removed while maintaining the advantages during manufacture, distribution, and retail of having an RFID device attached to the article.

While the above embodiments have been discussed in connection with an RFID device, the RFID device could be any wireless device. For example, the wireless device could be a transponder.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A label assembly comprising:
a base label having a top side and a bottom side, said top side having an exposable portion and an unexposable portion, said bottom side including a permanent pressure-sensitive adhesive adapted to permanently adhere said base label to an article;
a content label including a removable portion and having a top side and a bottom side, said bottom side of said removable portion including a temporary adhesive releasably adhering said bottom side of said removable portion to said top side of said exposable portion of said base label, wherein said content label further includes a permanent portion permanently adhered to said unexposable portion of said base label, wherein said content label further includes a line of weakening between said removable portion and said permanent portion; and
a wireless device secured to said removable portion of said content label, whereby said wireless device may be removed from said label assembly by removing said removable portion of said content label from said exposable portion of said base label.

2. The label assembly of claim 1, wherein said top side of said exposable portion and said top side of said removable portion both include substantially similar graphics, whereby said label assembly has a substantially similar appearance with and without said removable portion of said content label.

3. The label assembly of claim 1, wherein said top side of said exposable portion includes non-confidential markings and said top side of said removable portion includes confidential markings, whereby said label assembly is free of said confidential markings after said removable portion of said content label is removed from said exposable portion of said base label.

4. The label assembly of claim 1, further comprising:
a release liner releasably adhered to said bottom side of said base label.

5. The label assembly of claim 1, wherein said exposable portion of said base label comprises said base label entirely.

6. The label assembly of claim 1, wherein said removable portion of said content label comprises said content label entirely.

7. The label assembly of claim 1, wherein said base label is transparent.

8. A self adhesive label comprising:
a wireless device;
a content label including a top side and a bottom side and further including a permanent portion and a removable portion and a line of weakening between said removable portion and said permanent portion, said removable portion of said content label including said wireless device;
a base label having a top side and a bottom side and further including an unexposable portion and an exposable portion;
permanent adhesive securing said bottom side of said permanent portion of said content label to said top side of said unexposable portion of said base label; and
temporary adhesive removably attaching said bottom side of said removable portion of said content label to said top side of said exposable portion of said base label, whereby said removable portion including said wireless device can be easily removed from said base label by peeling said removable portion from said base label.

9. The self adhesive label of claim 8, further comprising:
a release liner releasably adhered to said base label to facilitate application of said self adhesive label.

10. The self adhesive label of claim 8, wherein said temporary adhesive comprises pressure sensitive adhesive.

11. The self adhesive label of claim 8, wherein said removable portion of said content label includes confidential information.

12. The self adhesive label of claim 8, wherein:
said removable portion of said content label includes markings; and
said exposable portion of said base label includes markings substantially similar to said markings on said removable portion of said content label, allowing said self adhesive label to appear substantially similar with or without said removable portion of said content label.

13. The self adhesive label of claim 8, wherein said wireless device comprises an RFID device.

* * * * *